A. H. NIRDLINGER.
BURIAL-CASKETS.

No. 194,530. Patented Aug. 28, 1877.

Attest
R. E. White
Jacob Spahn

Inventor
Albert H. Nirdlinger,
per R. F. Osgood
Atty.

UNITED STATES PATENT OFFICE.

ALBERT H. NIRDLINGER, OF ROCHESTER, NEW YORK, ASSIGNOR TO THE STEIN MANUFACTURING COMPANY, OF SAME PLACE.

IMPROVEMENT IN BURIAL-CASKETS.

Specification forming part of Letters Patent No. 194,530, dated August 28, 1877; application filed May 25, 1877.

*To all whom it may concern:*

Be it known that I, ALBERT H. NIRDLINGER, of the city of Rochester, in the county of Monroe and State of New York, have invented a certain new and useful Improvement in Burial-Caskets; and I do hereby declare that the following is a full, clear, and exact description of the construction and operation of the same, reference being had to the accompanying drawings, in which—

Figure 1:
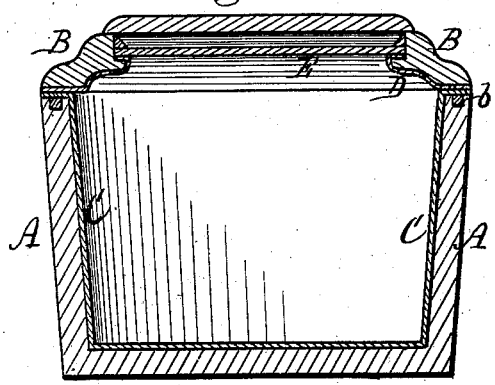
Figure 2:
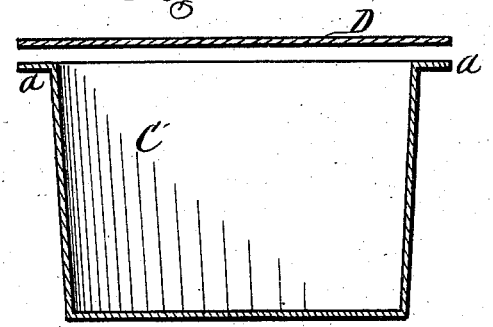
Figure 3:
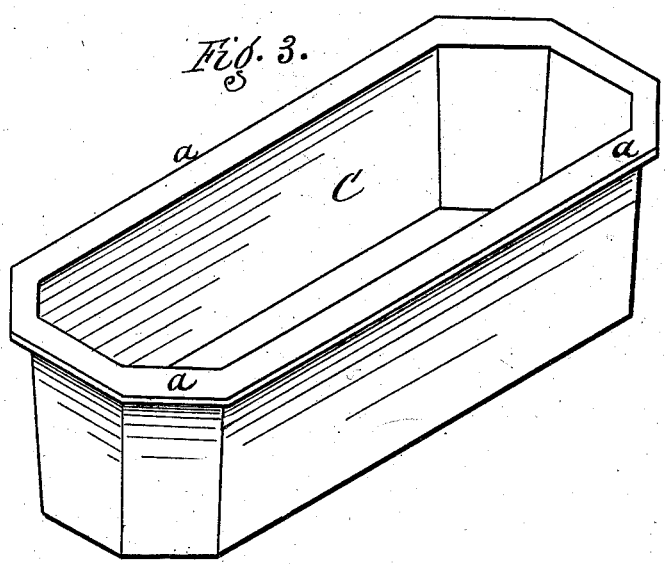
Figure 4:
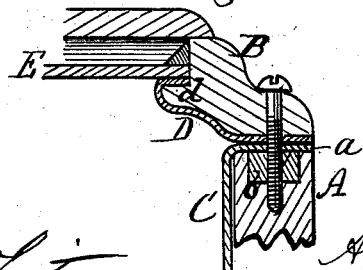

Figure 1 is a cross-section of a burial-casket provided with my improvement. Fig. 2 is a cross-section of the rubber lining of the casket and lid removed from place. Fig. 3 is a perspective view of the interior lining of the casket. Fig. 4 is a cross-section through the face-plate and molding of the lid.

My invention relates to burial-caskets; and the object is to employ a removable interior lining of rubber for rendering the casket air-tight.

The invention consists of a portable or removable interior rubber lining for the body of the casket, in combination with a rubber sheet extending across and covering the bottom of the lid, all constructed and arranged as hereinafter more fully set forth.

A represents the casket, which is of ordinary form. B is the lid. C is the interior lining for the body of the casket. It is made of rubber in the form of a receptacle, which fits closely into the casket, but is removable therefrom, being, therefore, fitted to enter any casket of the same form and size. The joints or seams of the rubber are cemented, so as to make them air-tight. At the top is a horizontal flange, a, which extends around the whole margin, and rests on the upper edge of the casket. In addition to this a rubber gasket or packing, b, may be set in a groove in the upper edge of the casket, projecting a little above the surface, as shown in Fig. 1, but under ordinary circumstances this will not be necessary.

D is a sheet of rubber secured on the under side of the lid, and covering the whole surface, except where the face-glass E rests. At this point the rubber is turned upward and inward, and turned in upon the rabbet or shoulder d, upon which the edge of the glass rests.

A rubber cement is applied between the glass and the rubber, which soon hardens and renders the joint air-tight. A rubber cement or putty is also applied in the angle outside the glass, as shown.

The edges of the rubber at the margin of the lid extend out far enough to rest upon and cover the edges a of the casket-lining, and when the lid is clamped in place by screws or otherwise. the edges are pressed together, which renders the joint air-tight.

This invention is of great value in transporting bodies to distant points, as ordinary wood caskets can be made air-tight in a few moments' time, and at small expense, and without adding appreciably to the weight. Iron caskets are objectionable from their great weight and cost. At the same time, since these attachments are portable, the same casket can be used either with or without the attachments, so that an undertaker has to keep but one line of goods.

Such caskets are also desirable for burials, as they will be kept air-tight till they naturally decay.

I design to use upon the top of the lid, near the cross-bar, a cock or valve, to let off gases when desired.

I am aware that various devices—such, for instance, as the building of a sheet-metal receptacle into the body of the casket—are well known; but such devices are expensive, involving much cost, and they add to the weight of the casket.

I am also aware that in receptacles of various kinds portable or removable linings have been employed.

My invention consists, not in the removable casket-lining alone, but the combination of such a lining and a sheet of rubber laid over the whole under side of the lid, except the face-plate, whereby the lid as well as the casket is impervious to air.

What I claim as new is—

In a burial-casket, the combination of the portable or removable lining C, formed to fit within the casket, and the rubber sheet D, covering the bottom of the lid, said parts formed with flanges or edges overlapping and resting between the edges of the casket and lid, as and for the purpose specified.

In witness whereof I have hereunto signed my name in the presence of two subscribing witnesses.

ALBERT H. NIRDLINGER.

Witnesses:
  R. F. OSGOOD,
  CHAUNCEY NASH.